(12) United States Patent
Kim et al.

(10) Patent No.: US 12,545,496 B2
(45) Date of Patent: Feb. 10, 2026

(54) APPARATUS FOR ACCOMMODATING BATTERY CELL

(71) Applicant: SK On Co., Ltd., Seoul (KR)

(72) Inventors: Do Young Kim, Daejeon (KR); Young Jin Jang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 259 days.

(21) Appl. No.: 18/361,919

(22) Filed: Jul. 31, 2023

(65) Prior Publication Data

US 2024/0262610 A1    Aug. 8, 2024

(30) Foreign Application Priority Data

Feb. 7, 2023   (KR) .................. 10-2023-0016213
Apr. 21, 2023  (KR) .................. 10-2023-0052623

(51) Int. Cl.
*B65D 85/30* (2006.01)
*B65D 61/00* (2006.01)
*H01M 10/42* (2006.01)

(52) U.S. Cl.
CPC ............. *B65D 85/30* (2013.01); *B65D 61/00* (2013.01); *H01M 10/42* (2013.01)

(58) Field of Classification Search
CPC ........ B65D 61/00; B65D 85/30; G04C 10/00; H01M 10/42; H01M 50/202; H01M 50/216; H01M 50/247; H01M 50/262; H01M 50/271; H01M 6/00; H01M 10/04; H01M 50/256
USPC ..................................... 206/703; 429/96–100
See application file for complete search history.

(56) References Cited

U.S. PATENT DOCUMENTS

| | | | | |
|---|---|---|---|---|
| 5,117,977 A | * | 6/1992 | Voroba ................... | B65D 83/04 206/704 |
| 5,199,565 A | * | 4/1993 | Voroba ............... | B65D 83/0454 206/704 |
| 5,263,577 A | * | 11/1993 | Paratte ................... | G04C 10/00 206/38.1 |
| 5,922,489 A | * | 7/1999 | Adachi ................. | H01M 4/624 429/96 |

(Continued)

FOREIGN PATENT DOCUMENTS

| | | |
|---|---|---|
| CN | 115051015 A | 9/2022 |
| EP | 4105144 A1 | 12/2022 |

(Continued)

OTHER PUBLICATIONS

Extended European Search Report for European Patent Application No. 23189160.7 issued by the European Patent Office on Oct. 1, 2024.

*Primary Examiner* — Bryon P Gehman
(74) *Attorney, Agent, or Firm* — IP & T GROUP LLP

(57) ABSTRACT

The apparatus for accommodating a battery cell according to the present disclosure may comprise a cell accommodating portion which protrudes in a vertical direction from an upper surface of the transporting portion and in which a battery cell may be disposed; at least one fixing member which is disposed on the accommodating portion and which is capable of fixing the battery cell to the cell accommodating portion; and at least one stopper which is disposed on the cell accommodating portion and which prevents the battery cell from falling from the cell accommodating portion while the transporting portion moves.

6 Claims, 7 Drawing Sheets

(56) References Cited

U.S. PATENT DOCUMENTS

| | | | | |
|---|---|---|---|---|
| 7,285,008 B2 * | 10/2007 | Tsai | ................ | H01R 13/41 |
| | | | | 439/500 |
| 11,502,367 B2 * | 11/2022 | Fukuda | ............... | H01M 50/271 |

FOREIGN PATENT DOCUMENTS

| | | | | |
|---|---|---|---|---|
| GB | 2377079 A | * | 12/2002 | .......... H01M 50/564 |
| KR | 10-0173259 B1 | | 3/1999 | |
| KR | 10-1843823 B1 | | 3/2018 | |

* cited by examiner

APPARATUS FOR ACCOMMODATING BATTERY CELL

CROSS-REFERENCE TO RELATED PATENT APPLICATION

The present application claims priority under 35 U.S.C. § 119(a) to Korean patent application number 10-2023-0016213 filed on Feb. 7, 2023 and Korean patent application number 10-2023-0052623 filed on Apr. 21, 2023, in the Korean Intellectual Property Office, the entire disclosure of which is incorporated by reference herein.

BACKGROUND OF THE INVENTION

1. Field

The present disclosure relates to an apparatus for accommodating battery cell. Specifically, it relates to an apparatus for accommodating battery cell for transporting battery cells.

2. Description of the Related Art

As the electronics, communications, and space industries develop, demand for secondary batteries as an energy power source is drastically increasing. In particular, as the importance of global eco-friendly policies is emphasized, the electric vehicle market is growing swiftly, and research and development on secondary batteries are being actively conducted worldwide.

A secondary battery may undergo various inspection processes during a manufacturing process. Many secondary batteries are transported to conduct inspection by using a transporting apparatus such as a conveyor belt, but there is possibility of unexpected damage such that secondary batteries fall from a transporting apparatus due to defects of transporting equipment or poor appearance of secondary batteries. The need for a fixing apparatus to prevent such damage and stably transport secondary batteries is increasing.

SUMMARY OF THE INVENTION

A problem to be solved by the present disclosure is to stably transport secondary batteries to prevent damage to secondary batteries.

Another problem to be solved by the present disclosure is to provide a stopper capable of preventing a secondary battery from falling from transporting equipment.

An apparatus for accommodating battery cell according to the present disclosure comprise a transporting portion disposed on a transporting device; a cell accommodating portion which protrudes in a vertical direction from an upper surface of the transporting portion and in which a battery cell may be disposed; at least one fixing member which is disposed on the accommodating portion and which is capable of fixing the battery cell to the cell accommodating portion; and at least one stopper which is disposed on the cell accommodating portion and which prevents the battery cell from falling from the cell accommodating portion while the transporting portion moves.

In addition, the at least one stopper may comprise a recessed portion surrounding one side surface of the battery cell.

In addition, the recessed portion may be formed on one surface of the stopper facing the battery cell to have a structure that is recessed in a direction away from the battery cell.

In addition, one area of the recessed portion may be located above the battery cell.

In addition, another area of the recessed portion may be located between the battery cell and the cell accommodating portion.

In addition, the recessed portion may be formed to be curved.

In addition, the transporting portion may be transported in one direction, and the direction in which the recessed portion is directed may be formed to be parallel to the one direction.

In addition, in a direction parallel to one side surface of the battery cell, the length of the stopper may be equal to or smaller than the length of one side surface of the battery cell.

In addition, the fixing member may contact with one side surface of the battery cell facing the transporting portion to fix the battery cell.

In addition, the fixing member may be a vacuum pad fixing the battery cell by adsorbing.

According to the present disclosure, batteries can be stably transported to prevent damage to secondary batteries.

In addition, batteries can be stably transported even when the function of a fixing member fixing a battery is abnormally operated.

In addition, falling of a battery can be prevented even when the coupling with a fixing member is released due to damage to a battery pouch.

DETAILED DESCRIPTION

Figure 1:
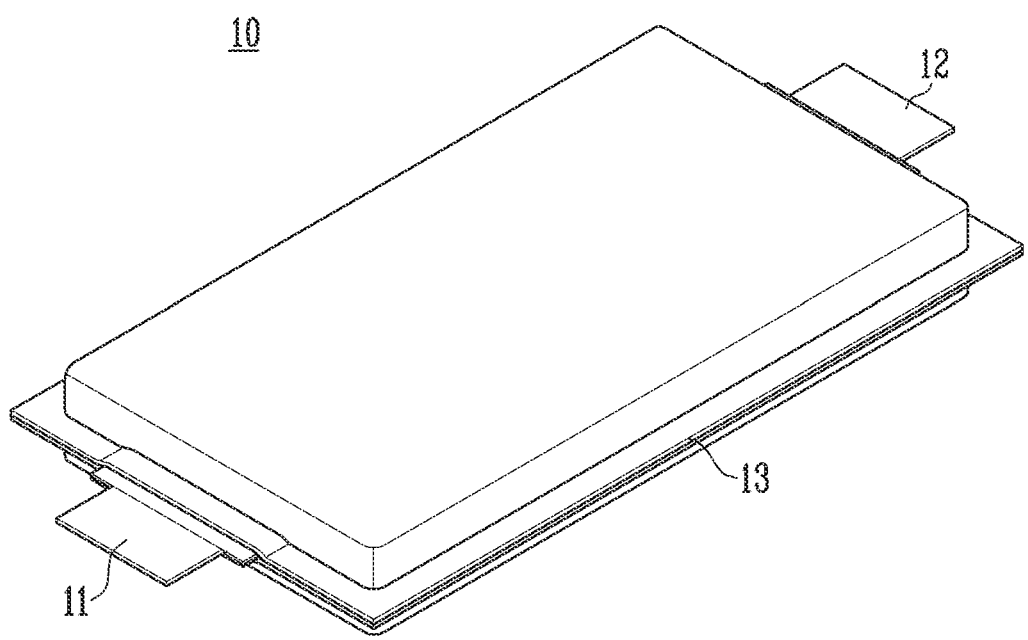
FIG. 1 is a perspective view showing a battery cell that can be accommodated in an apparatus for accommodating battery cell according to the present disclosure.

Hereinafter, preferred Examples of the present disclosure will be described in detail with reference to the accompanying drawings. The configuration or control method of a device to be described below is only for explaining an Example of the present disclosure, but is not intended to limit the scope of the present disclosure, and the same reference numerals used throughout the Specification indicate the same components.

Specific terminology used in this Specification is only for convenience of description and is not used as a limitation of Examples.

For example, expressions such as "same" and "being the same" not only represent exactly the same state, but also represent a state in which a tolerance or a difference to the extent in which the same function is obtained exists.

For example, expressions indicating relative or absolute arrangement such as "in a direction," "along a direction," "side by side," "vertically," "to the center," "concentric," or "coaxial," not only exactly represent such an arrangement, but also represent a state of relative displacement with a tolerance or an angle or distance to the extent in which the same function can be obtained.

To explain the present disclosure, a spatial Cartesian coordinate system with X, Y, and Z axes orthogonal to each other will be described below. Each axis direction (X-axis direction, Y-axis direction, Z-axis direction) means both directions in which each axis extends.

The X-direction, Y-direction, and Z-direction mentioned below are for explanation so that the present disclosure can be clearly understood, and of course, each direction may be defined differently depending on where the reference is placed.

The use of terms with expressions such as 'first, second, third' in front of the components mentioned below is only to avoid confusion between the components referred to, and is irrelevant to the order, importance or master-servant relationship, etc. between the components. For example, an invention comprising only a second component without a first component can be implemented.

A singular expression used in this Specification comprise a plural expression unless the context clearly dictates otherwise.

FIG. 1 is a perspective view showing a battery cell that can be accommodated in an apparatus for accommodating battery cell according to the present disclosure.

An apparatus for accommodating battery cell according to the present disclosure can stably transport a battery cell. Referring to FIG. 1, a battery cell 10 may comprise an electrode assembly (not shown) and a battery pouch 13 accommodating an electrode assembly. An electrode assembly may comprise a cathode, an anode, and a separator. A separator may be interposed between a cathode and an anode to be stacked. A cathode may comprise a cathode active material, and an anode may comprise an anode active material capable of intercalating and deintercalating lithium (Li) ions generated from a cathode active material.

In addition, each of a cathode and an anode may further comprise a binder and a conductive material to improve mechanical stability and electrical conductivity. A separator may be configured to prevent an electrical short between a cathode and an anode and to generate a flow of ions. The type of a separator is not particularly limited, but may comprise a porous polymer film. An electrode assembly may be manufactured by stacking, zigzag stacking, or winding by alternately stacking a plurality of cathodes and anodes and interposing separators between the cathodes and anodes.

A battery cell may further comprise an electrolyte solution. An electrolyte may be a non-aqueous electrolyte solution. An electrolyte solution may comprise a lithium salt and an organic solvent.

A battery pouch 13 may comprise a lower pouch and an upper pouch forming an accommodating space therein. A cup portion accommodating an electrode assembly may be formed in a lower pouch or an upper pouch. A cup portion may prevent an electrode assembly from being separated from a pouch. A pouch exterior material may be provided with an external insulating layer made of a polymer material, an internal adhesive layer, and a metal layer interposed between the external insulating layer and the internal adhesive layer. Herer, aluminum may be used as a material of the metal layer for the pouch exterior material, but the material is not limited thereto. A battery pouch 13 may comprise a sealing portion. When a pouch accommodates an electrode assembly, the pouch may be sealed through a sealing portion. An electrode tab may be interposed between sealing portions.

An electrode tab 11, 12 may be provided on each electrode plate of an electrode assembly, and one or more electrode tabs may be respectively connected to a cathode and an anode and may protrude out of the pouch to electrically connect the battery cell to the outside.

Electrode tabs may be all formed on one side surface of a battery pouch and may be respectively formed on one side surface and the other side surface opposite thereto. Referring to FIG. 1, a battery cell may comprise a cathode tab 11 on one side surface and an anode tab 12 on the other side surface.

A plurality of electrode tabs may be formed. For example, a first cathode tab and a first anode tab may be formed on one side, and a second cathode tab and a second anode tab may be formed on the other side.

Figure 2:
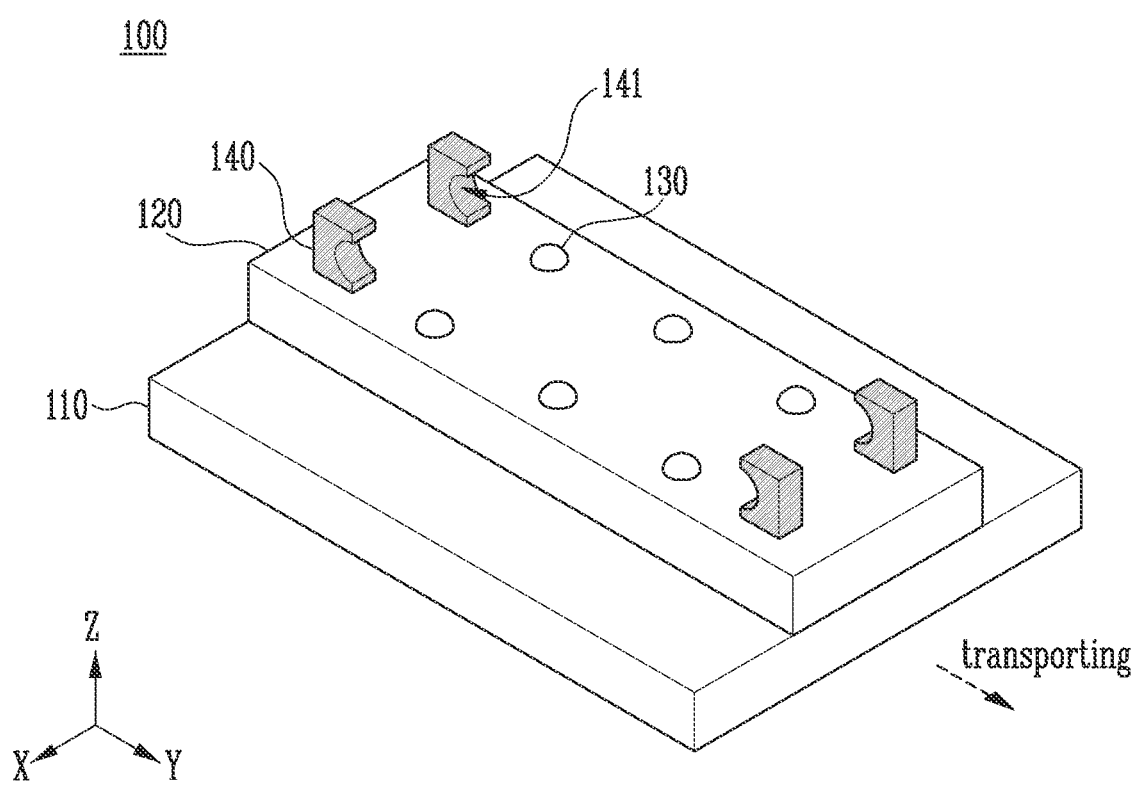
FIG. 2 is a perspective view of an apparatus for accommodating battery cell according to the present disclosure.
Figure 3:
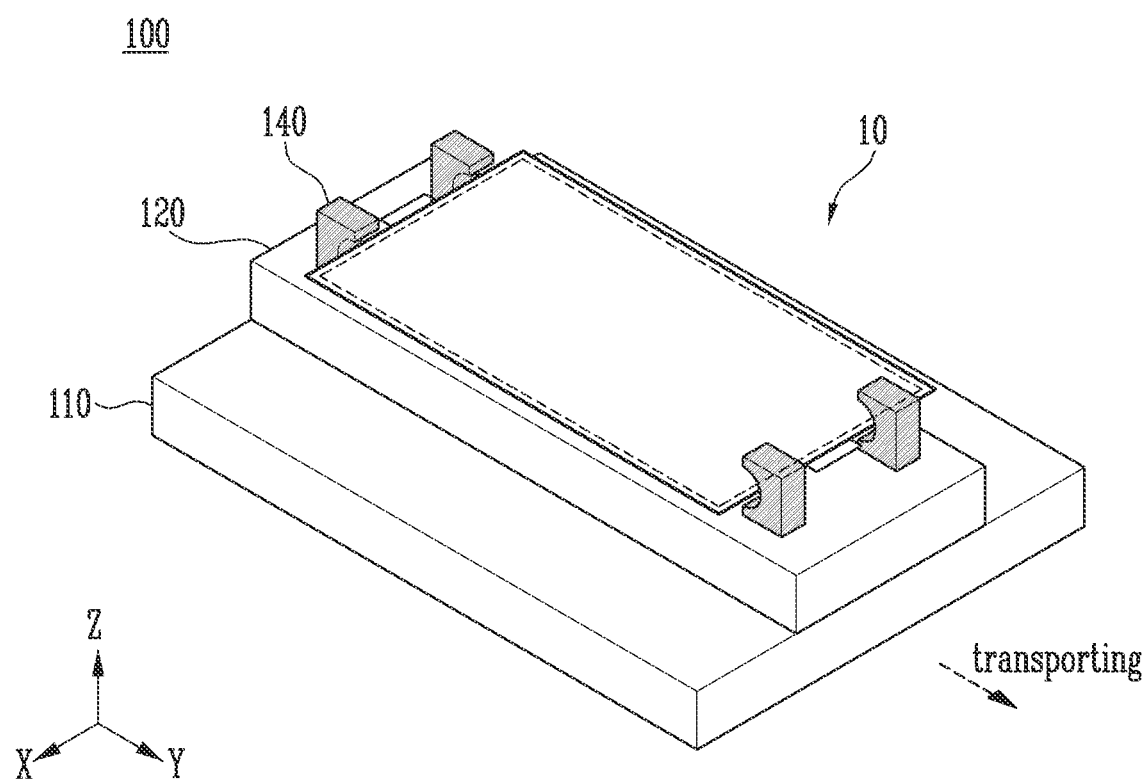
FIG. 3 is a perspective view showing a battery cell accommodated in an apparatus for accommodating battery cell according to the present disclosure.

FIG. 2 is a perspective view of an apparatus for accommodating battery cell according to the present disclosure, and FIG. 3 is a perspective view showing a battery cell accommodated in an apparatus for accommodating battery cell according to the present disclosure.

Referring to FIG. 2, an apparatus for accommodating battery cell comprises a transporting portion, a cell accommodating portion, a fixing member, and a stopper. A transporting portion 110 may be disposed above a transporting apparatus (not shown). A transporting apparatus may be an apparatus for transporting an object by using power. A transporting apparatus may be, for example, a conveyor belt, a structure capable of magnetic levitation movement, and the like. A transporting portion may be transported by a transporting apparatus. A transporting portion 110 may be provided with a corresponding shape to move by being fastened with a transporting apparatus. Alternatively, a transporting portion 110 may be placed on a transporting apparatus without being fastened. A transporting portion 110 may have a plate shape.

A battery cell 10 may be disposed above a cell accommodating portion 120. A cell accommodating portion 120 may protrude from an upper surface of a transporting portion 110 in a vertical direction. A cell accommodating portion 120 may be provided to be flat so that a battery cell 10 may be disposed thereon. Since a cell accommodating portion 120 is formed to protrude, a battery cell 10 may be disposed to be spaced apart from a transporting portion 110 so that inspection equipment can approach the battery cell 10 more closely. Inspection equipment is located at a distance from the top of a transporting portion and is capable of inspecting an edge of a battery cell.

A fixing member 130 is disposed on a cell accommodating portion 120 to fix a battery cell 10 to the cell accommodating portion. A fixing member 130 may contact with a battery cell to prevent the battery cell 10 from moving. A fixing member 130 may pressurize or compress a battery cell 10 to fix the battery cell 10. Preferably, a fixing member 130 may fix a battery cell by adsorbing the same.

A fixing member 130 may contact with one surface of a battery cell 10 facing a transporting portion 110 to fix a battery cell. One surface of a battery cell 10 facing a transporting portion 110 may form a wide surface. A fixing member 130 may contact with the center and an edge of a wide surface of a battery cell 10.

A fixing member 130 may be a vacuum pad fixing a battery cell 10 by adsorbing. Fixing a battery cell 10 by adsorbing can prevent external damage to the battery cell 10. Compared to a method of fixing a battery cell 10 by compressing and a method of fixing by pressurizing by using a pressurizing apparatus, a battery cell 10 may be fixed with a relatively weak force. As described above, when a plurality of fixing members 130 are disposed, a battery cell 10 may be stably disposed even with a weak force because the fixing members contact with many areas of the battery cell 10.

Referring to FIG. 3, a battery cell 10 may be disposed in an apparatus for accommodating battery 100 to be transported. In the process of transporting a battery cell 10, when fixing is released, the battery cell 10 may be separated from a transporting portion 110. For example, when the appearance of a battery cell 10 is damaged and so one surface of the battery cell 10 is unevenly formed, or when the function of a fixing member 130 fails, the battery cell 10 may be separated from a cell accommodating portion. Since a battery cell 10 is spaced apart from a cell accommodating portion, when the battery call is separated from the cell accommodating portion, the battery cell may fall, resulting in a battery cell failure.

To prevent a battery cell 10 from falling, an apparatus for accommodating battery 100 further comprises a stopper 140. A stopper 140 may be disposed on cell accommodating portion 120 to prevent a battery cell 10 from falling from the cell accommodating portion 120 while a transporting portion 110 moves. Therefore, a stopper 140 may be an apparatus for stably transporting a battery cell 10 together with a fixing member 130.

Figure 4:
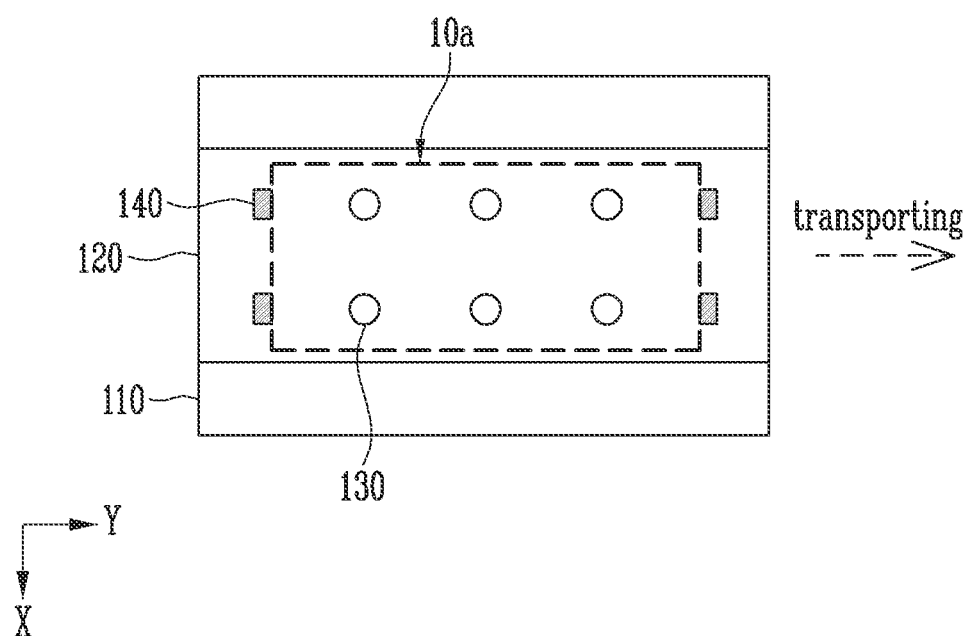
FIG. 4 is a diagram of an apparatus for accommodating battery cell according to the present disclosure viewed from the top.
Figure 5:
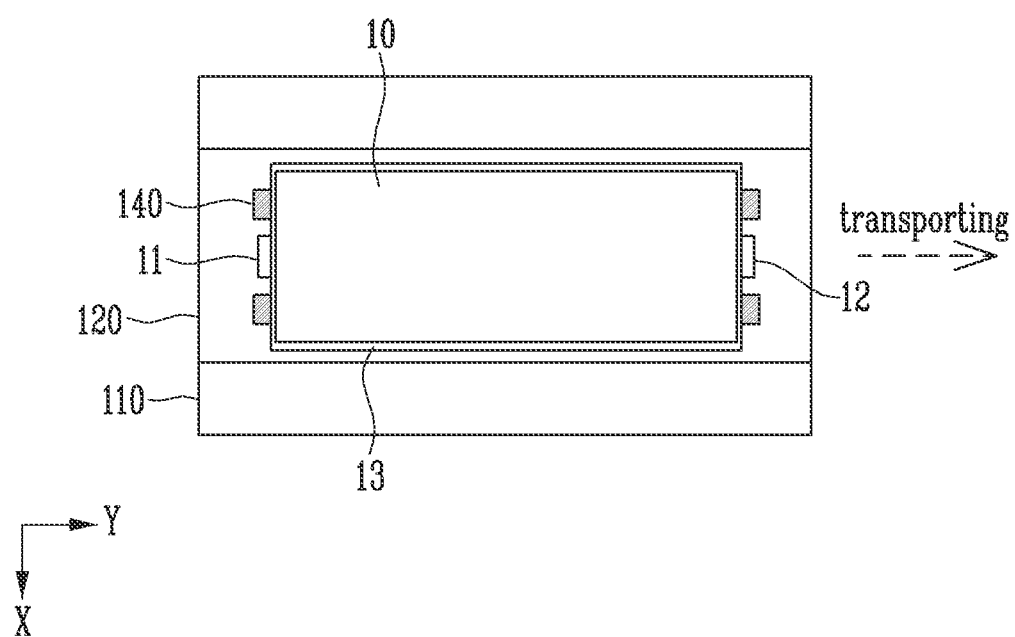
FIG. 5 is a diagram of a battery cell accommodated in an apparatus for accommodating battery cell according to the present disclosure viewed from the top.

FIG. 4 is a diagram of an apparatus for accommodating battery cell according to the present disclosure viewed from the top, and FIG. 5 is a diagram of a battery cell accommodated in an apparatus for accommodating battery cell according to the present disclosure viewed from the top.

Referring to FIG. 4, a stopper 140 may be disposed in an area adjacent to an edge of a battery cell on a cell accommodating portion 120. A cell accommodating portion 120 may comprise a cell area 10a accommodating a battery cell. A cell area 10a may be located at the center of a cell accommodating portion 120. A fixing member 130 may be disposed on a cell area 10a. A stopper 140 may be disposed at an edge of a cell area 10a. When a battery cell 10 moves out of a cell area 10a due to release of fixing to a fixing member 130, the battery cell may contact with a stopper located at an edge of the cell area 10a.

When a battery cell 10 is located in a cell area, a portion of the battery cell 10 and a stopper 140 may overlap. The portion of the battery cell overlapping the stopper 140 may be a battery pouch. Without being limited thereto, a cup portion of a battery pouch may overlap a stopper 140. Due to the overlapping of a battery cell and a stopper 140, the balance of the battery cell in the horizontal direction can be maintained when the battery cell moves out of the cell area.

Figure 6:
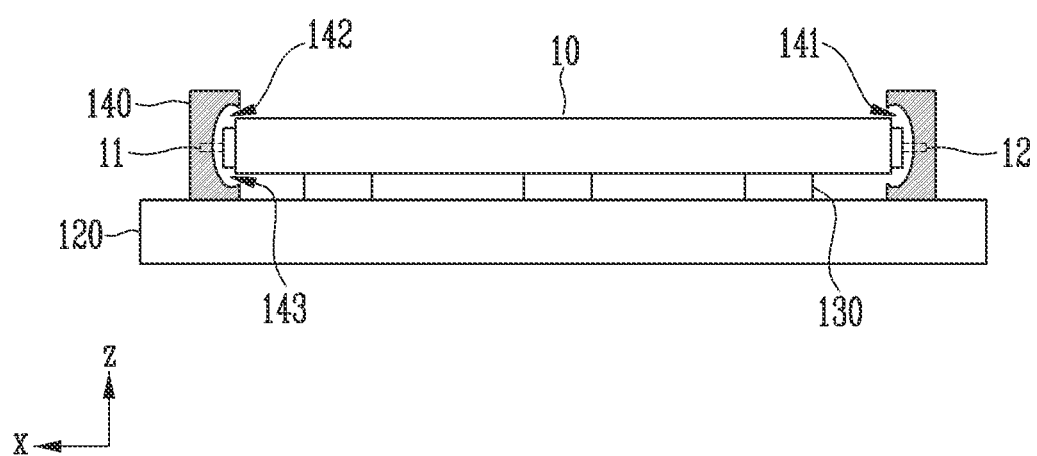
FIG. 6 is a diagram of a battery cell accommodated in an apparatus for accommodating battery cell according to the present disclosure viewed from a side.
Figure 7:
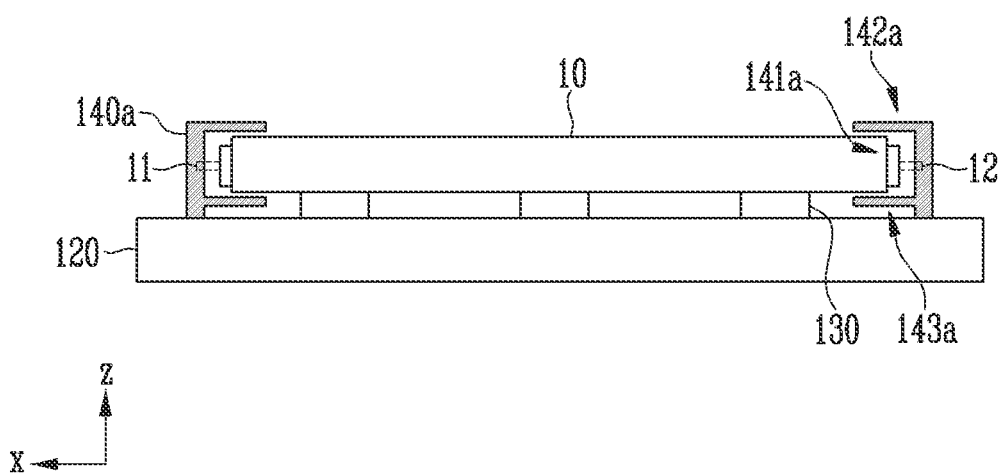
FIG. 7 is a diagram of a battery cell accommodated in an apparatus for accommodating battery cell according to another Example of the present disclosure viewed from a side.

FIG. 6 is a diagram of a battery cell accommodated in an apparatus for accommodating battery cell according to the present disclosure viewed from a side, and FIG. 7 is a diagram of a battery cell accommodated in an apparatus for accommodating battery cell according to another Example of the present disclosure viewed from a side.

A recessed portion 141 may be formed on one surface of a stopper 140 facing a battery cell 10. A recessed portion 141 may be formed on one surface of a stopper 140 to be recessed in a direction away from a battery cell 10. One side surface of a battery cell 10 may be located inside a space formed by being recessed.

To surround one side surface of a battery cell, a recessed portion 141 may have a shape in which the center is recessed. For example, referring to FIG. 6, a recessed portion 141 may comprise a recessed portion that is recessed in a direction away from a battery cell, from the upper and lower ends of the recessed portion 141 toward the center in the Z-axis direction.

One area 142 of a recessed portion may be located above a battery cell 10. When one area 142 of a recessed portion is located above a battery cell 10 and the battery cell 10 is inclined, the battery cell 10 and the recessed portion 141 may contact with each other.

The other area 143 of a recessed portion may be located between a battery cell 10 and a cell accommodating portion 120. When the other area 143 of a recessed portion is located between a battery cell and a cell accommodating portion and the battery cell is inclined, the battery cell 10 and the recessed portion 141 may contact with each other.

In a direction perpendicular to a cell accommodating portion 120, one area 142 and the other area 143 of a recessed portion may overlap with each other. One area 142 of a recessed portion and the other area 143 of the recessed portion may be formed in a corresponding shape with a battery cell 10 interposed therebetween. Through this, falling of a battery cell may be effectively prevented.

A recessed portion 141 may be formed to be curved. A surface formed by a recessed portion 141 may form a gentle curve. Through this, one area of a battery cell may be located deep within a recessed portion, and even when there is a slight movement of a battery cell 10, fall of the battery may be prevented.

According to an Example, a stopper 140a may comprise a main body spaced apart from a battery cell and formed on a cell accommodating portion and a first cover 142a and a second cover 143a extending from the main body. A main body, a first cover 142a, and a second cover 143a may form a recessed portion 141a. Referring to FIG. 7, a first cover 142a may be located above a battery cell, and a second cover 143a may be located between a battery cell 10 and a cell accommodating portion 120. Therefore, when a battery cell is separated from a cell accommodating portion, the battery cell may contact with a main body, a first cover, and a second cover so that the battery cell may be prevented from falling.

A transporting portion 110 is transported in one direction by a transporting apparatus, and the direction in which a recessed portion 141 is directed may be parallel to the one direction. One direction here refers to a preset direction as a direction in which a transporting apparatus moves. The direction to which a recessed portion 141 is directed refers to a direction toward one surface of a stopper 140 in which a recessed portion is formed inside the recessed portion. When a stopper 140 is ahead of a battery cell 10 in a transporting direction, a recessed portion 141 may be formed in a direction opposite to the transporting direction. Conversely, when a stopper 140 is located behind a battery cell 10, a recessed portion 141 may be formed toward the transporting direction. A battery cell 10 may have an inertial force to move along a transporting direction, and when the fixing with a fixing member 130 is released, the battery cell 10 may fall along the transporting direction. Therefore, by disposing a recessed portion 141 of a stopper side by side with a transporting direction, a battery cell 10 may be prevented from falling due to an inertia.

A plurality of stoppers 140 may be disposed with a battery cell 10 therebetween in one direction in which a transporting portion 110 is transported. Preferably, the same number of stoppers 140 may be disposed on one side surface of a battery cell facing one direction as the other side surface opposite to the one side surface. When a battery cell 10 is inclined in a transporting direction, stoppers 140 located on one side surface facing the transporting direction and stoppers 140 located on the other side surface may be equally disposed to stably protect both side surfaces of the battery cell.

In a direction parallel to one side surface of a battery cell 10, the length of a stopper 140 may be equal to or smaller than the length of one side surface of the battery cell 10. Stoppers 140 uniformly receive pressure to prevent a battery cell 10 from falling.

Although the preferred Examples of the present invention have been shown and described above, the present invention is not limited to the specific preferred Examples described above, and without departing from the gist of the present invention claimed in the claims, any one of ordinary skill in the art can make various modifications, of course, and such changes are within the scope of the claims.

What is claimed is:

1. An apparatus for accommodating a battery cell comprising:
    a transporting portion disposed on a transporting device;
    a cell accommodating portion which protrudes in a vertical direction from an upper surface of the transporting portion and in which a battery cell may be disposed;
    at least one fixing member which is disposed on the accommodating portion and which is capable of fixing the battery cell to the cell accommodating portion; and
    at least one stopper which is disposed on the cell accommodating portion and which prevents the battery cell from falling from the cell accommodating portion while the transporting portion moves,
    wherein at least one stopper comprises a recessed portion surrounding one side surface of the battery cell,
    wherein the recessed portion is formed on one surface of the stopper facing the battery cell to have a structure that is recessed in a direction away from the battery cell,
    wherein one area of the recessed portion is located above the battery cell, and
    wherein another area of the recessed portion is located between the battery cell and the cell accommodating portion.

2. The apparatus for accommodating a battery cell according to claim 1, wherein the recessed portion is formed to be curved.

3. The apparatus for accommodating a battery cell according to claim 1, wherein the transporting portion is transported in one direction, and the direction in which the recessed portion is directed is formed to be parallel to the one direction.

4. The apparatus for accommodating a battery cell according to claim 1, wherein a length of the at least one stopper is equal to or smaller than a length of one side surface of the battery cell.

5. The apparatus for accommodating a battery cell according to claim 1, wherein the at least one fixing member contacts with one side surface of the battery cell facing the transporting portion to fix the battery cell.

6. The apparatus for accommodating a battery cell according to claim 1, wherein the at least one fixing member is a vacuum pad fixing the battery cell by adsorbing.

* * * * *